Nov. 23, 1926.
J. B. BAILEY
1,608,473
COMBINATION PAIL AND SIFTER
Filed Dec. 29, 1922
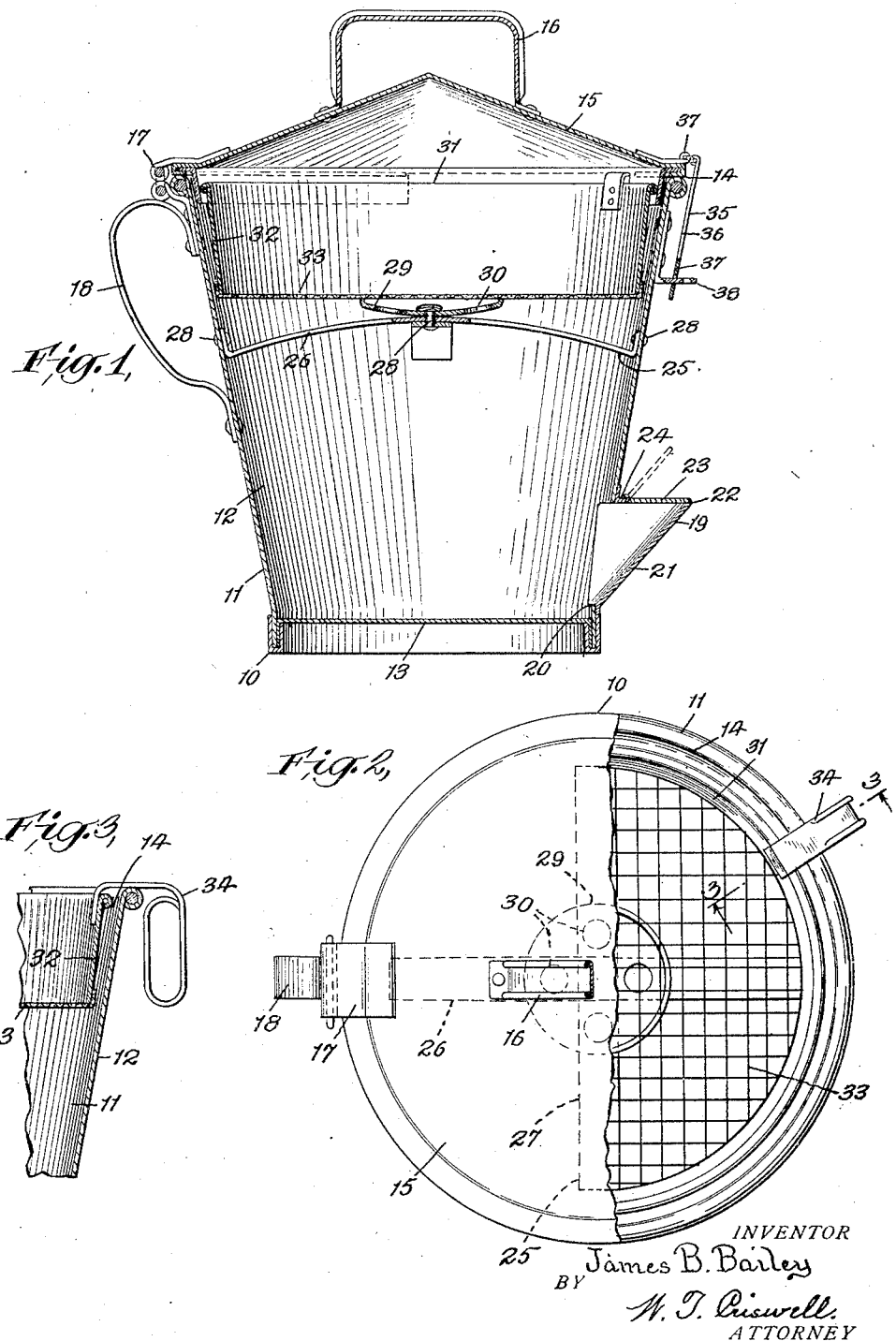
INVENTOR
James B. Bailey
BY
W. T. Criswell.
ATTORNEY Patented Nov. 23, 1926.

1,608,473

UNITED STATES PATENT OFFICE.

JAMES B. BAILEY, OF NEW YORK, N. Y.

COMBINATION PAIL AND SIFTER.

Application filed December 29, 1922. Serial No. 609,672.

This invention relates to a class of devices adapted to be used for separating powdered particles from lump substances.

My invention has for its object primarily to provide a sifter adapted to be made in sizes and forms for use whereby the cinders of coal and like fuel may be readily separated from the ashes, in order to permit the cinders to be reburned as well as avoiding spreading of the ash dust in the surrounding atmosphere, and which may also be made in forms for convenient use in kitchens and elsewhere for sieving various powdered substances. The invention consists essentially of a receptacle having a lid closed entrance and having in its lower part a door closed outlet. Within the receptacle above the outlet may be a rotary support, and on this support in the entrance portion of the receptacle is a removable sieve element for receiving the substances to be sifted when admitted through the entrance of the receptacle, and the sieve element is manually rotatable for causing the contents in powdered form to pass through the sieve as well as causing the large particles or granules or lumps to be retained in the sieve. The lumps may then be removed from the sieve, and the powdered particles may also be removed from the receptacle through its outlet by tilting the receptacle without requiring the receptacle with its contents to be lifted.

A further object of the invention is to provide a combination pail and sifter of a simple, efficient and durable construction which may be made in any appropriate shape and size.

With these and other objects in view, the invention will be hereinafter more fully described with reference to the accompanying drawing forming a part of this specification in which similar characters of reference indicate corresponding parts in all the views, and will then be pointed out in the claim at the end of the description.

In the drawing, Figure 1 is a sectional view, partly in detail, taken through one form of combination pail and sifter embodying my invention.

Fig. 2 is a top plan, partly broken away, of the device, and

Fig. 3 is a fragmentary sectional view, partly in detail, taken on the line 3—3 of Fig. 2.

The device or sifter has a receptacle 10 with a hollow body 11 which may be of any suitable size and shape, though the form of the body illustrated has a downwardly tapered annular wall 12 with a bottom 13 in its lower end. The entrance or open top 14 of the body is closed by a lid or cover 15 of preferably somewhat a cone-shape, and on the central part of the upper face of the cover may be a handle, as 16. The cover 15 is hinged, at 17, to part of the upper edge of the wall 12 of the body 10 to allow the cover to be swung by moving its handle to open and closed positions on the entrance 14 of the body, and on the upper part of the wall 12 of the body may be a handle, as 18, for permitting the receptacle to be conveniently lifted and moved by a person. In the lower part of the wall 12 of the body may be an outlet 19 in the form of an opening 20 in the wall, and on the exterior of the wall, over the opening 20 is a spout, as 21, having in its upper part an exit 22 which is in opposed relation to the upper part or the entrance 14 of the body. The exit 22 of the spout 21 is adapted to be opened and closed by a door or lid, as 23, which is hinged, at 24, to the wall 12 of the body for being swung to and from the spout over its exit 22. By this form of the door closed outlet the contents of the interior of the body will be prevented from automatically passing or flowing through the outlet, but by lifting and tilting the receptacle accordingly the body will be emptied by its contents passing through the opening 20 into the spout 21 and thence through the exit 22. The lid 23 will swing to an open position with the tilting of the receptacle.

In the upper part of the interior of the body 10 of the receptacle may be a fixed bracket 25 composed of one or two strips or flat bars 26, 27 which are disposed in cruciform arrangement crosswise of the interior. These bars are preferably of shapes with their ends curved downwardly, and the end of the bars are riveted or otherwise secured, as at 28, to the inner face of the side wall 12 in spaced relation to the upper edge of the body. On the peak of the arcuate bars 26, 27 is pivoted, at 28, the central part of a rotary support 29 which may be in the form of a substantially cup-shaped or parabolic plate having spaced perforations 30 therethrough. The edge of the rotary cup-shaped plate or support is therefore in spaced relation to the entrance 14 of the body.

Within the body 10 above the support 29 is a removable sieve 31 of a preferred form having an annular wall 32 with a bottom 33 made of wire mesh or perforated sheet metal. The intersticed bottom 33 of the sieve rests upon the rotary perforated support 29 of the bracket 25 of the body 10, and the wall 32 may be of a height so that its upper edge is approximately flush with the upper edge of the wall 12 of the body. The wall 32 and the bottom 33 of the sieve are of diameters so that the sieve may be freely revolved in the body. The rotary support 29 and the downwardly curved formations of the bars 26, 27 of the bracket 25 permits of unobstructed movement of the sieve, and on part of the upper edge of the wall 32 of the sieve may be a handle, as 34, in the form of a ring or loop extending angularly from the wall of the sieve over and beyond the side wall of the body for allowing a person to revolvably operate the sieve. When it is desired to operate the device, ashes or other material is placed within the sieve following the opening of the cover 15, and by rotatably moving the handle 34 the sieve 31 will be revolved back and forth for causing the powdered or fine particles of the material to pass through the interstices of the bottom 33 of the sieve into the lower part of the body 10. The sieve may then be removed from the body for pouring therefrom the cinders, or large particles or lumps of the material, and after the cover 15 is closed on the entrance of the body, the receptacle is tilted for discharging the powdered material from the body through the outlet 19, as above explained. The cover 15 may be releasably fastened to the body 10 by a catch, as 35, which may be of any appropriate type, though the form of the catch shown includes a strip or hasp 36 having one of its ends hinged, at 37, to the cover to allow the strip to be swung upwardly and downwardly toward and from the body 10. In the other end part of the strip is an opening or slot 37 for removably receiving a lug or an eye, as 38, provided on the exterior of the wall 12 of the body when the strip is swung downwardly for releasably locking the lid to the body.

While in the foregoing description, I have embodied the preferred form of my invention, I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

A screening device, comprising a receptacle having an annular wall with a lid closed entrance at its upper end and having a discharge opening adjacent its lower end, a spout on the exterior of the edge of the opening and having its outlet in opposed relation to the entrance of the receptacle, a door hinged to the wall of the receptacle for closing and opening the outlet of the spout, stationary cross bars on the upper part of the interior of the receptacle, a rotary orificed cup-shaped support on the cross bars and a screen removably supported thereby.

This specification signed this 28th day of December A. D. 1922.

JAMES B. BAILEY.